United States Patent Office 3,681,088

Patented Aug. 1, 1972

1

3,681,088

NOVEL FLAVORING COMPOSITIONS UTILIZING THIAZO DERIVATIVES

Ira Katz, Elberon, and Richard A. Wilson and Christopher Giacino, Monmouth Beach, N.J., assignors to International Flavors & Fragrances Inc., New York, N.Y.

No Drawing. Filed Oct. 14, 1969, Ser. No. 866,399
Int. Cl. A23l 1/26
U.S. Cl. 99—140 R 7 Claims

ABSTRACT OF THE DISCLOSURE

Methods and compositions for flavoring foodstuffs utilizing hydroxyalkylthiazo and acyloxyalkylthiazo derivatives.

BACKGROUND OF THE INVENTION

The present invention relates to compositions containing thiazo-based flavoring agents capable of imparting hearty flavors such as meat, poultry, fish, or bread flavors and aromas to foodstuffs.

Artificial flavoring agents for foodstuffs have received increasing attention in recent years. In many areas, such food flavoring agents are preferred over natural flavoring agents, at least in part because of the uniform flavor that may be so obtained. For example, natural food flavoring agents such as extracts, essences, concentrates and the like are often subject to wide variation due to changes in the quality, type, and treatment of the raw materials. Such variation can be reflected in the end product and results in unreliable flavor characteristics and uncertainty as to consumer acceptance and cost. Additionally, the presence of the natural product in the ultimate food may be undesirable because of increased tendency to spoil. This is particularly troublesome in convenience and snack food usage where such products as dips, soups, chips, prepared dinners, canned goods, sauces, gravies, and the like are apt to be stored by the consumer for some time prior to use.

A desideratum in the preparation of flavoring agents is the achievement of true flavor reproduction. This generally proves to be a difficult task since the mechanism for flavor development in many foods is not understood.

Reproduction of meat, poultry, and fish flavors and aromas has been the subject of a long and continuing search by those engaged in the production of foodstuffs. The shortage of foods, especially protein foods, in many parts of the world has given rise to the need for utilizing non-meat sources of proteins and making such proteins as palatable and attractive as possible.

Moreover, there are a great many fish-, poultry-, or meat-containing or meat-based foods presently distributed in a preserved form, examples being condensed soups, dry soup mixes, dried meats, freeze-dried or lyophilized meats, packaged gravies, and the like. While these products contain meat or meat extracts, the fragrance, taste, and other organoleptic factors are very often impaired by the processing operations, and it is desirable to supplement or enhance the flavors of these preserved meat, poultry, or fish foods.

THE INVENTION

The present invention provides methods and compositions for flavoring foodstuffs and also contemplates the foodstuffs so obtained. Briefly, the invention comprises the addition to a foodstuff or flavoring composition of at least one thiazo derivative having the formula

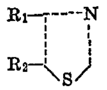

wherein one of $R_1$ and $R_2$ represents a primary or secondary hydroxyalkyl or acyloxyalkyl and the other represents hydrogen or alkyl, and the dashed lines represent single or non-adjacent double bonds. Such thiazo compounds can accordingly be used alone or in admixture with other flavoring components, as further described hereinafter, to provide flavoring and flavor-enhancing compositions and novel foodstuffs.

It will be appreciated by those skilled in the art that the foregoing structure includes thiazole derivatives having the formula

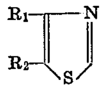

thiazoline derivatives having the formulas

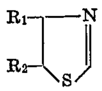 , 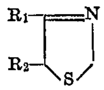 and 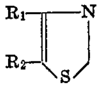

and thiazolidine derivatives having the formula

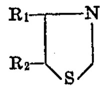

wherein $R_1$ and $R_2$ are as stated above.

In the practice of this invention the lower alkyl groups having from one to six carbon atoms are desirably used, and those having from one to three carbon atoms, particularly methyl, ethyl, and propyl, are preferred. Further, it is desirable that the hydroxyalkyl group be a lower hydroxyl group containing from one to six carbon atoms. The hydroxyl group is primary, secondary, or tertiary. In certain preferred embodiments of the invention, the hydroxyl group is substituent on the beta carbon atom, so that when three or more carbon atoms are present in the hydroxyalkyl group the hydroxyl group is secondary or tertiary. When the hydroxyl group is not in the beta position, it is desirably in the omega position, that is, at the distal end of the hdroxyalkyl chain. A preferred hydroxyalkyl group is beta-hydroxyalkyl.

It will be understood from the present description that alkyl esters yielding the thiazo derivatives can also be utilized in the practice of the present invention. Thus, the use of the corresponding acyloxy derivatives, that is, the esters of carboxylic acids and the hydroxyalkyl groups is also contemplated herein. The lower alkyl esters having from one to about six carbon atoms in the carboxylic acid (or acyloxy group) is desirable. The acetoxy and propionoxy groups are preferred acyloxy groups in certain aspects of the present invention.

Thiazo compounds contemplated for use herein include:

4-methyl-5-(beta-hydroxyethyl)thiazole
4-methyl-5-(beta-acetoxyethyl)thiazole
4-ethyl-5-(beta-hydroxyethyl)thiazole
4-prop-2-yl-5-(beta-hydroxyethyl)thiazole
4-butyl-5-(beta-hydroxyethyl)thiazole
4-methyl-5-(hydroxymethyl)thiazole
4-methyl-5-(beta-hydroxypropyl)thiazole
4-prop-2-yl-5-(beta-hydroxybutyl)thiazole
4-pent-3-yl-5-(beta-hydroxybutyl)thiazole
4-hexyl-5-(zeta-hydroxyhexyl)thiazole
4-ethyl-5-(gamma-acetoxypropyl)thiazole
4-ethyl-5-(beta-propanoyloxyethyl)thiazole
4-propyl-5-(propanoyloxymethyl)thiazole
4-ethyl-5-(epsilon-butanoyloxypentyl)thiazole
4-methyl-5-(beta-pentanoyloxyethyl)thiazole.

Moreover, the thiazo derivative can also be provided in the form of a thiazolonium, thiazolinonium, or thiazolidonium compound. The thiazolonium chloride and benzthiazolonium chloride derivatives, for example, can also be used to yield the corresponding thiazo material in the practice of this invention.

The thiazole derivatives can be prepared by a number of reaction sequences. The preparation of 4-alkyl-5-hydroxyalkylthiazoles is shown, for example, in U.S. Pat. 2,139,570, and Buchman et al. show syntheses of thiazoles in J.A.C.S., 67, 395 (March 1945).

The processes and compositions according to the present invention are capable of providing a wide variety of flavors and/or aromas to foodstuffs. It will be appreciated by those skilled in the art that the flavor and aroma of foodstuffs are mutually interdependent so that the two frequently act together to impart a single overall organoleptic impression to the product. Accordingly, the processes and compositions of this invention can alter, modify, enhance, or vary both the flavor and aroma of foodstuffs.

Moreover, various thiazo materials according to the present invention can be utilized to provide distinctive aromas in perfume materials for use with food-related or non-food products. Further, the thiazo derivatives can be used to provide desired food-like, freshly-baked aromas to food products when they are cooked, roasted, baked or otherwise heated or prepared for consumption. Thus, it is possible to prepare thiazo derivative-containing compositions to impart a fresh bread-like aroma during baking.

Many of the thiazo derivatives utilized herein are susceptible of being used in relatively small amounts to improve, alter, enhance or vary the taste of materials for oral consumption. In one test utilizing a 20-judge panel to evaluate flavor and aroma, the median of the panelists detected the improvement by 4-methyl-5-(beta-hydroxyethyl) thiazole of the odor in an aqueous solution at the level of 0.25 p.p.m. and the improvement of taste at 0.09 p.p.m. All parts, proportions, percentages, and ratios herein are by weight unless otherwise indicated.

The precise minimum concentration level for detection of a thiazo derivative according to the present invention will vary according to the product in which it is tested, the particular thiazo derivative or combination of thiazo derivatives, the temperature at which it is evaluated or used, and similar factors. There is also among different persons a subjective difference in their ability to detect the improvement, and the particular threshold level can be affected by the state of health of the person, whether and what materials were previously evaluated or consumed, and the like. Nevertheless, very good results can be obtained according to the invention under the conditions hereinafter taught.

The processes and compositions herein described can provide a wide variety of hearty food flavors, such as meat, poultry, including chicken, turkey, and the like, freshly cooked fish, and bakery-like, including bread, rolls, and the like. This spectrum of flavors and aromas is varied by usage level, product in which used, particular thiazo derivatives and the like.

Thus, the present invention provides compositions for providing hearty flavors to foodstuffs including comestible liquids such as broths and other beverages. The thiazo derivatives can be used as complete flavors, as components of flavoring compositions, and to enhance, vary, alter, modify, or improve the flavors of foodstuffs alone or in combination with other ingredients. In some circumstances when only a single flavor impression is desired the thiazo derivative or derivatives can be added alone and will provide substantially the entire flavor and aroma impression to a product.

More generally, the thiazo derivatives of this invention can be admixed with other materials to provide a flavoring composition or a flavor-enhancing composition. As used herein, a flavoring composition is one which provides substantially the entire flavor and aroma impression to a foodstuff, and a flavor-enhancing composition is one suited for addition to a natural or other product to provide only the flavor and aroma notes lacking in the original foodstuff. An example of this latter use would be addition of a flavor-enhancing composition to a chicken or vegetable-beef soup to give a flavor impression more like that of freshly made soup by supplying nuances which have been destroyed or altered in processing.

Thus, the thiazo derivatives according to this invention can be combined with adjuvant ingredients as necessary to impart special characteristics. Such other ingredients include vehicles such as water, ethanol, propylene glycol, glycerol, glyceride oils and the like, and carriers such as gum arabic, tragacanth, and the like to provide a base for spray-dried or other solid flavor compositions. They also include thickeners such as alginates, carrageenin, and the like to impart a heavier body to gravies and similar products; condiments and spices such as salt, pepper, allspice, basil, capsicum extract, cloves, diacetyl, eugenol, garlic oil, onion oil, oregano extract, pyroligneous acid, sage oil, sodium citrate, thyme, hydrolyzed vegetable protein, and the like; encapsulating agents so that the flavor composition can be coacervated to provide microencapsulated products; coloring agents such as the approved food, drug and cosmetic colors, vegetable colors, caramel, and the like; other flavoring materials as required to provide the desired flavor impression, flavor intensifiers such as monosodium glutamate and the various nucleotides; freshness preservers and antioxidants such as ascorbic acid, propyl gallate, butylated hydroxyanisole, and butylated hydroxytoluene; and the like. It will be appreciated that only some of these materials need be added to obtain a flavoring or flavor-enhancing composition.

When used as components of flavoring compositions and flavor enhancing compositions, it is generally desirable that the reaction products of this invention comprise from 0.001 to about 10% of the total composition, although greater or lesser amounts can be used in some embodiments. The amounts used in a particular composition will vary according to the factors as indicated above.

The thiazo derivatives of this invention can be incorporated into foods such as soups and soup mixes, casserole dishes, canned and frozen vegetables, animal and pet foods and other veterinary products, sauces, gravies, broths, stews, simulated meat products, dietetic products, meat spreads and dips, bakery products, as substitutes or fortifiers for meat extracts, and the like. It is generally preferred that from about one part per billion to about 500 parts per million of the derivatives of the present invention be comprised in the total foodstuff to be flavored. Amounts somewhat less or somewhat greater than this can also be utilized, dependent upon the particular thiazo derivative, the foodstuff to be improved, personal preferences and local tastes, and the like.

Greater amounts than shown above generally contribute nothing to the flavor and, besides tending to unbalance the flavor, are uneconomical.

It will accordingly be appreciated that the present invention also provides a process for altering, improving, fortifying, or enhancing the flavors of a wide variety of foodstuffs. Such a process can be carried out by adding the thiazo derivative to the food. The process can also comprise one or more steps of heating the thiazo derivative or derivatives with the foodstuff, components of the foodstuff, or components of the flavor or flavor-enhancing compositions.

The following examples are given to illustrate embodiments of the invention as it is presently preferred to practice it. It will be understood that these examples are illustrative, and the invention is not to be considered as restricted thereto except as indicated in the appended claims.

EXAMPLE I

The following are homogeneously admixed at 25° C.:

| Ingredients— | Parts |
|---|---|
| Vegetable shortening | 622.7 |
| Salt | 321.7 |
| Glutamic acid | 5.1 |
| L-cysteine hydrochloride | 10.3 |
| Glycine | 5.1 |
| Beta-alanine | 1.3 |
| Taurine | 20.0 |
| Mixture of disodium inosinate and disodium guanylate | 3.3 |
| 5-propyl-4-(beta-hydroxyethyl)thiazole | 10.3 |

This mixture is heated to 300° F. for thirty seconds. After cooling to 100° F., 0.12 part of diacetyl and 0.10 part of hexanal are added. The resulting mixture has an excellent chicken flavor and aroma.

EXAMPLE II

The following materials are homogeneously mixed at 25° C.:

| Ingredients— | Parts |
|---|---|
| Vegetable shortening | 622.7 |
| Salt | 321.7 |
| Glutamic acid | 5.1 |
| L-cysteine hydrochloride | 10.3 |
| Glycine | 5.1 |
| Beta-alanine | 1.3 |
| Taurine | 20.0 |
| Mixture of disodium inosinate and disodium guanylate | 3.3 |

The mixture is heated at 300° F. for 30 seconds. After cooling to 100° F., 0.12 part of diacetyl and 0.10 part of hexanal are added. After aging the resulting mixture for three hours, 10.3 parts of 5-(hydroxymethyl)-4-propylthiazole is added.

The resulting mixture is aged for ten hours to provide a material having an excellent chicken flavor and aroma.

EXAMPLE III

| Ingredients— | Parts |
|---|---|
| Vegetable shortening | 622.7 |
| Salt | 321.7 |
| Glutamic acid | 5.1 |
| L-cysteine hydrochloride | 10.3 |
| Glycine | 5.1 |
| Beta-alanine | 1.3 |
| Taurine | 20.0 |
| Mixture of disodium inosinate and disodium guanylate | 3.3 |
| 4-methyl-5-(beta-hydroxyethyl)thiazole | 10.3 |

This mixture is heated to 300° F. for 30 seconds. After cooling to 100° F., 0.12 part of diacetyl and 0.10 part of hexanal are added.

The resulting mixture has an excellent chicken flavor and aroma.

EXAMPLE IV

The following ingredients are homogeneously mixed at 25° C.:

| Ingredients— | Parts |
|---|---|
| Vegetable shortening | 622.7 |
| Salt | 321.7 |
| Glutamic acid | 5.1 |
| L-cysteine hydrochloride | 10.3 |
| Glycine | 5.1 |
| Beta-alanine | 1.3 |
| Taurine | 20.0 |
| Mixture of disodium inosinate and disodium guanylate | 3.3 |

The mixture is heated to 300° F. for 30 seconds. After cooling to 100° F., 0.12 part of diacetyl, 0.10 part of hexanal, and 10.3 parts of 4-methyl-5-(beta-hydroxyethyl)thiazole are added.

The resulting mixture has an excellent chicken flavor and aroma.

EXAMPLE V

The following ingredients are homogeneously mixed at 25° C.:

| Ingredients— | Parts |
|---|---|
| Vegetable shortening | 622.7 |
| Salt | 321.7 |
| Glutamic acid | 5.1 |
| L-cysteine hydrochloride | 10.3 |
| Glycine | 5.1 |
| Beta-alanine | 1.3 |
| Taurine | 20.0 |
| Mixture of disodium inosinate and disodium guanylate | 3.3 |

The mixture is heated to 300° F. for 60 seconds. After cooling to 100° F., 0.12 part of diacetyl and 0.10 part of hexanal are added. After aging the mixture for a period of three hours at a temperature of 65° F., 10.3 parts of 4 - methyl - 5 - (beta - hydroxyethyl)thiazole are added. The resulting mixture is then aged for ten hours to yield a composition having an excellent chicken aroma and flavor.

EXAMPLE VI

Cysteine hydrochloride in the amount of 8.8 g. is refluxed at 125° F. under atmospheric pressure for four hours with a mixture of 309 g. of hydrolyzed vegetable protein and 674 grams of water. Subsequent to the reflux, the mixture is cooled and 8.8 g. of 4-methyl-5-(beta-hydroxyethyl)thiazole is added and intimately admixed with the composition. The mixture has an excellent beef flavor.

EXAMPLE VII

5 - methyl - 4 - (beta - acetoxyethyl)thiazole in the amount of 8.8 g. is refluxed at 215° F. under atmospheric pressure for four hours with the following pre-mix composition:

| Ingredients— | Amount, grams |
|---|---|
| Hydrolyzed vegetable protein (Maggi 4BE) | 309 |
| Water | 674 |

Subsequent to the reflux period, the resulting mixture is aged for 72 hours at 60–65° C. The mixture has an excellent beef aroma and flavor.

EXAMPLE VIII

4 - methyl - 5 - (beta - hydroxyethyl)thiazole in the amount of 8.8 g. is refluxed at 215° F. under atmospheric pressure for four hours with the following pre-mix composition:

| Ingredient— | Amount, grams |
|---|---|
| Hydrolyzed vegetable protein (Maggi 4BE) | 309 |
| Water | 674 |

Subsequent to the reflux, the resulting mixture is aged for 72 hours at 60–75° C. The mixture has an excellent beef aroma.

EXAMPLE IX

The composition prepared in Example I is dissolved in propylene glycol to provide a 0.1% solution. This solution in the amount of 0.966 g. is added to 7.3 g. of a soup base consisting of:

| Ingredients— | Parts |
|---|---|
| Fine ground sodium chloride | 35.62 |
| Hydrolyzed vegetable protein | 27.40 |
| Monosodium glutamate | 17.81 |
| Sucrose | 10.96 |
| Beef fat | 5.48 |
| Sethness caramel color (Powder B&C) | 2.73 |

The resulting mixture is added to 12 ounces of boiling water to obtain a soup having an excellent chicken flavor.

The composition of Example VII (0.005 g.) when added to the above soup base also provides a soup having good meat flavor. Similar results are obtained when bis(2-ethyl-3-furyl) sulfide or bis(2-propyl-3-furyl) disulfide is used in addition to the propyl-beta-hydroxyethylthiazole.

EXAMPLE X

The composition prepared in Example VI is dissolved in propylene glycol to provide a 0.1% solution. This solution in the amount of 0.966 g. is added to 7.3 g. of a soup base consisting of:

| Ingredients— | Parts |
|---|---|
| Fine ground sodium chloride | 35.62 |
| Hydrolyzed vegetable protein (Maggi 4BE) | 27.40 |
| Monosodium glutamate | 17.81 |
| Sucrose | 10.96 |
| Sucrose | 5.00 |
| Beef fat | 5.48 |
| Sethness caramel color (Powder B&C) | 2.73 |

The resulting mixture is added to 12 ounces of boiling water to obtain a soup having an excellent chicken flavor.

The composition of Example III (0.005 g.) when added to the above soup base also provides a soup having good meat flavor. Similar results are obtained when bis(2-ethyl-3-furyl) sulfide or bis-(2-propyl-3-furyl) disulfide is used in addition to the methyl-beta-hydroxyethylthiazole.

EXAMPLE XI

One-half gram of the soup base mixture of Example IX is emulsified in a solution containing 100 g. gum arabic and 300 g. water. The emulsion is spray-dried with a Bowen Lab Model Drier utilizing 250 c.f.m. of air with an inlet temperature of 500° F., an outlet temperature of 200° F., and a wheel speed of 50,000 r.p.m.

Twelve grams of the spray-dried material is mixed with 29.2 g. of the soup base set forth in Example VII. The resulting mixture is then added to 12 ounces of boiling water, and an excellent meat flavored soup is obtained.

EXAMPLE XII

The following ingredients are selected and mixed as described in Example I to yield compositions having excellent meat flavor:

Mixture A

| Ingredients— | Parts |
|---|---|
| 2-methylfuran-3-thiol | 5 |
| 2-methyl-3-mercapto-(4,5H)-dihydrofuran | 5 |
| Bis(2-methyl-3-furyl)disulfide | 1 |
| 4-methyl-5-(beta-hydroxyethyl)thiazole | 40 |
| Bis(2-methyl-3-furyl)monosulfide | 49 |

Mixture B

| Ingredients— | Parts |
|---|---|
| Bis(2-methyl-3-furyl)trisulfide | 10 |
| Bis(4-methyl-3-furyl)trisulfide | 3 |
| Bis[4-propyl-(4,5H)-dihydro-3-furyl]monosulfide | 1 |
| 4-methyl-5-(beta-acetoxyethyl)thiazole | 26 |
| Bis(2,5-dimethyl-3-furyl)monosulfide | 10 |
| Corn oil | 50 |

Mixture C

| Ingredients— | Parts |
|---|---|
| 2-ethylfuran-3-thiol | 9 |
| 2-butylfuran-3-thiol | 9 |
| Bis(2-pentyl-3-furyl)trisulfide | 10 |
| Bis[2-ethyl-5-isopropyl-(2,3H)-dihydro-3-furyl] trisulfide | 1 |
| 5-methyl-4-(beta-hydroxyethyl)thiazolinium benzylchloride | 10 |
| 4-methyl-5-(beta-hydroxyethyl)thiazole | 10 |
| Bis(2-butyltetrahydro-3-furyl)monosulfide | 1 |
| Gum arabic | 50 |

EXAMPLE XIII

The following ingredients are homogeneously admixed at 25° C.:

| Ingredients— | Parts |
|---|---|
| Ethanol | 98.89 |
| Abhexone[5-ethyl-3-hydroxy-4-methyl-(2,5H)-dihydrofuran-2-one] | 0.19 |
| 2-methyl-3-furan-thiol | 0.25 |
| Bis(2-methyl-3-furyl)disulfide | 0.25 |
| 4-methyl-5-(beta-hydroxyethyl)thiazole | 0.25 |
| Lovage oil | 0.06 |
| 2,4-pentadienal | 0.03 |
| 2,4,5-trimethyl-$\Delta^3$-oxazoline | 0.08 |

The resulting mixture has an excellent hydrolyzed vegetable protein flavor.

EXAMPLE XIV

The composition prepared in Example XIII is dissolved in propylene glycol to provide a 0.1 percent solution. This solution in the amount of 0.966 gram is added to 7.3 grams of a soup base consisting of:

| Ingredients— | Amount |
|---|---|
| Sodium chloride | 35.62 |
| Monosodium glutamate | 17.81 |
| Hydrolyzed vegetable protein | 27.40 |
| Sucrose | 16.44 |
| Sethness caramel color (Powder B & C) | 2.73 |

The resulting mixture is added to 12 ounces of boiling water to obtain a soup having an excellent hydrolyzed vegetable protein flavor. Similar results are obtained when the bis(2-methyl-3-furyl)-sulfide is replaced with bis(2-ethyl-3-furyl)monosulfide or bis(2-propyl-3-furyl)disulfide; and when the 4-methyl-5-(beta-hydroxyethyl)thiazole is replaced with any of the following materials:

4-methyl-5-(beta-acetoxyethyl)thiazole
4-ethyl-5-(beta-hydroxyethyl)thiazole
4-propyl-5-(beta-hydroxyethyl)thiazole
4-prop-2-yl-5-(beta-hydroxyethyl)thiazole
4-butyl-5-(beta-hydroxyethyl)thiazole
4-methyl-5-(hydroxymethyl)thiazole
4-methyl-5-(beta-hydroxypropyl)thiazole
4-methyl-5-(gamma-hydroxypropyl)thiazole
4-prop-2-yl-5-(beta-hydroxybutyl)thiazole

EXAMPLE XV

Into a 2-liter flask equipped with stirrer, thermometer, addition funnel and condenser is introduced 100 grams of 5-methyl-4-(beta-hydroxy-n-propyl)thiazole. The material is cooled to 0° C. and mixed with 300 cc. of 1 M NaOH. Over a period of 2 hours (while maintaining the reaction mass at 0° C. and with stirring) 500 cc. of 2 M aqueous sodium borohydride is added. After all of the sodium borohydride is added, the temperature of reaction mixture is permitted to reach 25° C.

Slow crystallization yields 50 grams of 4-methyl-5-(beta-hydroxypropyl)thiazolidine.

EXAMPLE XVI

Into a 250 ml. flask equipped with stirrer, thermometer, addition funnel, and condenser is introduced 5 g. of 5-methyl-4-(beta-hydroxyethyl)thiazole and 15 ml. of water. The flask contents are cooled to 0° C., and a mixture of 15 ml. of 1 N sodium hydroxide (0.015 ml.) and 20 ml. of methanol is added. The mixture is then cooled to −12° C. and 2.4 g. of sodium trimethoxyborohydride is added during one-half hour.

After reaction is complete, the flask temperature is allowed to rise to 25° C. Slow crystallization yields a mixture of 4-methyl-5-(beta-hydroxyethyl)thiazolines.

EXAMPLE XVII

Fifty milligrams of 4-methyl-5-(beta-hydroxyethyl)thiazole is admixed with 20 ml. of propylene glycol. To an eight-ounce portion of a commercial canned vegetable soup mix is added 16 ounces of water and the mixture is heated to 70° C. Then one ml. of the thiazole-containing propylene glycol is added. The soup is found to have a meaty flavor character not found in vegetable soup made without thiazole.

What is claimed is:

1. A process for imparting flavor to foodstuffs comprising adding to such foodstuffs a small amount of at least one thiazo derivative having the formula

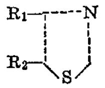

wherein one of $R_1$ and $R_2$ represents a primary or secondary hydroxyalkyl or acryloxyalkyl and the other represents hydrogen or alkyl, and the dashed lines represent single bonds, one double bond and two single bonds, or two non-adjacent double bonds joined by a single bond, the said thiazo derivative not being added in the form of cocoa.

2. A process according to claim 1 wherein there is added from one part per billion to 500 parts per million of said thiazo derivative or derivatives.

3. A process according to claim 1 wherein the thiazo derivative is a thiazole.

4. A process according to claim 1 wherein the hydroxyalkyl group contains from one to six carbon atoms, the alkyl group contains from one to six carbon atoms, and the acyl group contains from one to six carbon atoms.

5. A process according to claim 1 wherein the derivative is 4-methyl-5-(beta-hydroxyethyl)thiazole, 4-propyl-5-(beta-hydroxyethyl)thiazole, or 4 - methyl-5-(beta-acetoxyethyl)thiazole.

6. A food flavoring composition containing a small but effective amount sufficient to alter the flavor of a foodstuff of a thiazo derivative, said flavoring composition being free of cocoa, and having the formula

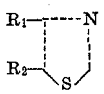

wherein one of $R_1$ and $R_2$ represents a primary or secondary hydroxyalkyl or acyloxyalkyl and the other represents hydrogen or alkyl, and the dashed lines represent single bonds, one double bond and two single bonds, or two-non-adjacent double bonds joined by a single bond, and another flavoring material other than alcohol.

7. A foodstuff containing a small amount effective to alter the flavor of said foodstuff of a thiazo derivative having the formula

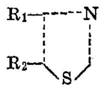

wherein one of $R_1$ and $R_2$ represents a primary or secondary hydroxyalkyl or acyloxyalkyl and the other represents hydrogen or alkyl, and the dashed lines represent single bonds, one double bond and two single bonds, or two non-adjacent double bonds joined by a single bond, the said thiazo derivative not being added in the form of cocoa.

References Cited

UNITED STATES PATENTS 3,503,758 3/1970 Wada et al. ---------- 99—140

FOREIGN PATENTS 1,156,473 6/1969 Great Britain.
1,156,485 6/1969 Great Britain.

OTHER REFERENCES

"Handbook of Chemistry and Physics," R. C. Weast, ed., 47th edition, C–74, C–565, Chem. Rubber Co., Cleveland, Ohio, 1966.

MORRIS O. WOLK, Primary Examiner
S. MARANTZ, Assistant Examiner

U.S. Cl. X.R.

99—107, 124; 260—302R, 306.7

IFF 2122

UNITED STATES PATENT OFFICE

CERTIFICATE OF CORRECTION

Patent No. 3,681,088 Dated Aug. 1, 1972

Inventor(s) IRA KATZ and RICHARD A. WILSON, and CHRISTOPHER GIACINO

It is certified that error appears in the above-identified patent and that said Letters Patent are hereby corrected as shown below:

Claim 1, column 9, line 39, change "acryloxyalkyl" to --acyloxyalkyl--.

Signed and sealed this 1st day of May 1973.

(SEAL)
Attest:

EDWARD M. FLETCHER, JR.
Attesting Officer

ROBERT GOTTSCHALK
Commissioner of Patents

Disclaimer and Dedication

3,681,088.—*Ira Katz*, Elberon, and *Richard A. Wilson* and *Christopher Giacino*, Monmouth Beach, N.J. NOVEL FLAVORING COMPOSITIONS UTILIZING THIAZO DERIVATIVES. Patent dated Aug. 1, 1972. Disclaimer and dedication filed Dec. 10, 1973, by the assignee, *International Flavors & Fragrances Inc.*

Hereby disclaims and dedicates to the Public the remaining term of said patent.

[*Official Gazette April 16, 1974.*]